US007056208B2

(12) United States Patent
Cogert

(10) Patent No.: US 7,056,208 B2
(45) Date of Patent: Jun. 6, 2006

(54) NO LIMIT POKER GAME

(76) Inventor: Mitchell Adams Cogert, 45 Red Hill Cir. #P, Tiburon, CA (US) 94920

( * ) Notice: Subject to any disclaimer, the term of this patent is extended or adjusted under 35 U.S.C. 154(b) by 0 days.

(21) Appl. No.: 10/777,963

(22) Filed: Feb. 13, 2004

(65) Prior Publication Data

US 2005/0179206 A1 Aug. 18, 2005

(51) Int. Cl.
*A63F 13/00* (2006.01)

(52) U.S. Cl. ........................................ 463/13; 273/292

(58) Field of Classification Search .................. 463/13, 463/16, 17, 20, 21–22, 25, 12; 273/143 R, 273/292
See application file for complete search history.

(56) References Cited

U.S. PATENT DOCUMENTS 5,752,702 A * 5/1998 McDoniel .................. 273/292
6,332,614 B1 * 12/2001 Hesse ......................... 273/292
6,575,467 B1 * 6/2003 Kal ............................ 273/292
6,637,747 B1 * 10/2003 Garrod ....................... 273/292

* cited by examiner

*Primary Examiner*—Kim Nguyen

(57) ABSTRACT

A poker card game that provides any player the opportunity to fold and get back a percentage of his wager once there is no more betting possible; that is when one or more players are said to have risked all their money or be "all-in". This safeguard is only available prior to revealing the next to last card or the last card. Any players remaining in a hand must combine their two cards to the five community cards to form their best five card poker hand. The player having the highest five card poke hand is the winter. This game reduces the element of luck and players experiencing "bad beats."

1 Claim, 1 Drawing Sheet

NO LIMIT POKER GAME

BRIEF SUMMARY OF THE INVENTION

The invention is a method of limiting a player's potential loss when playing No Limit Texas Hold 'Em. The invention enables a player who has moved all-in to withdraw from a hand at one of two distinct points thereafter and recover a specific percentage of his all-in wager, less a specific fee or charge for the election. Application of the invention thereby reduces the element of luck in No Limit Texas Hold 'Em.

Although the invention is in the nature of insurance against an unreasonable loss in any given hand, because the invention is a new and unique variant of No Limit Texas Hold 'Em that requires a modification in the manner of play of No Limit Texas Hold 'Em, it is equally accurate to characterize the invention as a new card game, as set forth more specifically in the Specification.

BRIEF DESCRIPTION OF THE DRAWINGS

FIG. 1 is described more completely in the section below entitled, "Detailed Description of the Invention—Subsection 2: Explanation of the Invention with Reference to the Drawings."

BACKGROUND OF THE INVENTION

1. Field of the Invention

Figure 1:
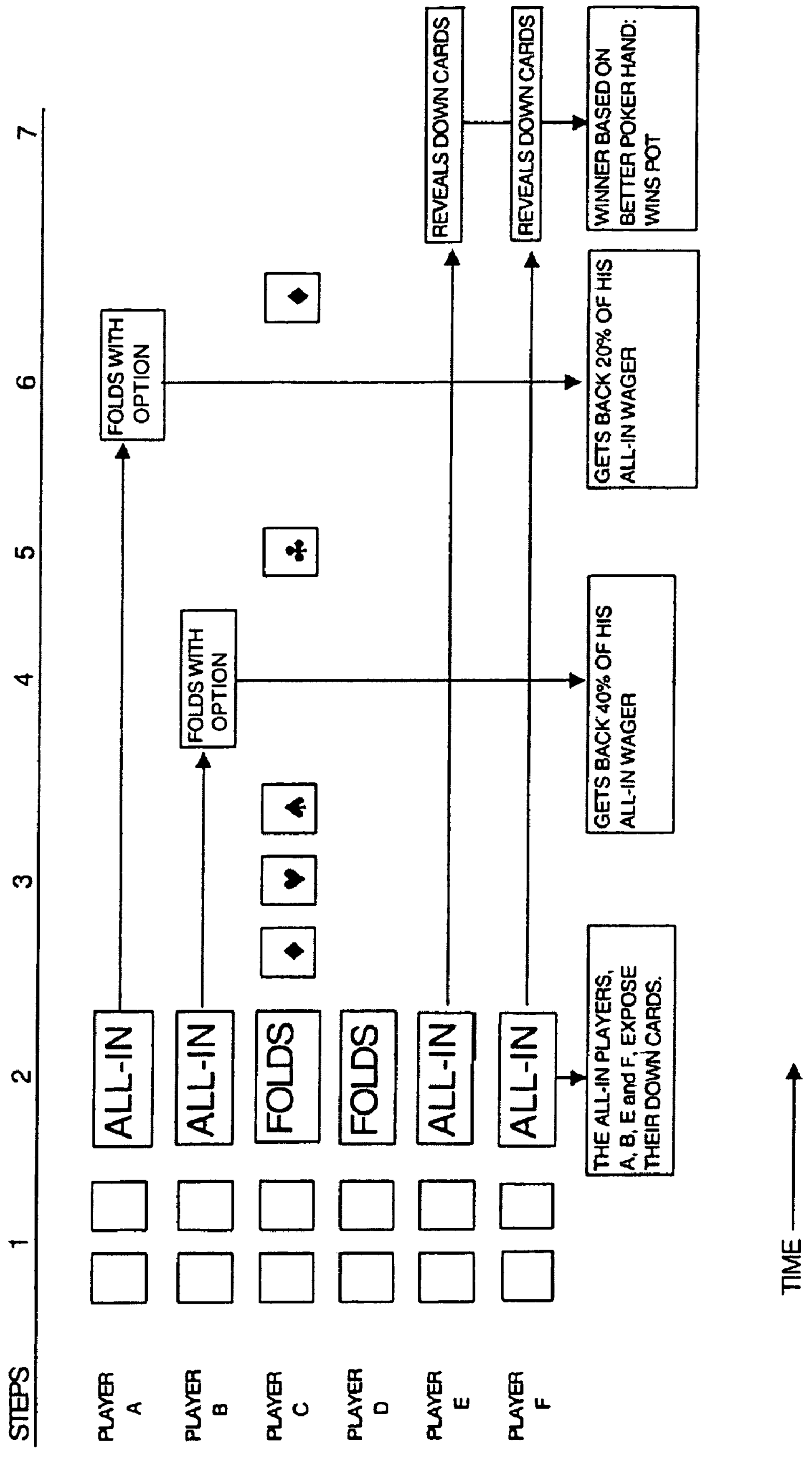
FIG. 1 is a diagram illustrating the application of the invention to a sequence of card playing and betting.

The Invention relates to gaming and to card games. More particularly, the Invention relates to a method of playing a card game consisting of a limited but indeterminate number of rounds in which a number of players receive playing cards and compete against each other with the prize being the total amount of money or chips wagered during a given hand.

2. Glossary of Terms Used

A. All-In "all-in" refers to an option to wager all of his remaining money or chips that may be exercised (i) by any player then participating in that hand (ii) in any of the several rounds of wagering associated with that hand.

B. Card or Cards: "card" or "cards" refer to conventional playing cards, i.e. a single deck of fifty two cards comprised of four suits (spades, hearts, clubs and diamonds) of thirteen cards each, with each suit including (in descending rank) one ace, one king, one queen, one jack, one ten, one nine, one eight, one seven, one six, one five, one four, one three and one two.

C. Community Cards: "community cards" refers to the cards that are dealt face-up and that may be used by all players then active in any given hand.

D. Down Cards: "down cards" refers to the cards dealt face-down to each player.

E. Fold: "fold" refers to a declaration by a player in a hand that he has decided to withdraw from the hand and forfeit the amount he has wagered prior to his declaration.

F. Hand: "hand" refers to a round of poker in which, in the case of both Texas Hold 'Em and California Hold 'Em, each player is dealt two down cards and has the use of up to five community cards.

G. Poker: "poker" refers to a classification of card game in which a number of players compete against each other in hands to win the pot, a prize which consists of the net amount wagered by all players in any given hand. The winner in each had is determined based upon a fixed ranking of hands, and may be determined by the highest hand, the lowest hand or split between the highest and lowest hand.

H. Texas Hold 'Em: "Texas Hold 'Em" refers to a poker game in which each player is dealt two down cards and, sequentially with rounds of wagering occurring after each event (including after the first two down cards are dealt, after the first three community cards are dealt, after the fourth community card is dealt, and after the fifth community card is dealt), three, then one, then a final community cards are dealt, with the winner based on the highest possible poker hand. Texas Hold 'Em games that incorporate the all-in variants of wagering are referred to as "No Limit Texas Hold 'Em" or just "No Limit Hold 'Em".

3. The Background Art

Legalized gaming has evolved from a simple, social pastime into a major commercial enterprise. Poker, in particular, due to its many variations, easy to understand rules, group participation nature and variability of stakes, has become the game of choice for popular gambling. At any given time, 24 hours every day of every week, many thousands of people world-wide will be playing poker at social or, more often, commercial venues, including card rooms, casinos, stand-alone console games, personal electronic games and on-line gambling facilities. There are even several television shows and magazines devoted exclusively to poker.

Of all the variants, one of the most popular poker games is Texas Hold 'Em, a game which awards a pot to the player having the highest five-card poker hand, ranked in standard poker fashion, i.e. royal flush, straight flush, four of a kind, full house, flush, straight, three of a kind, two pair, one pair, and high card, in descending order. Texas Hold 'Em is played sequentially through eight separate steps, as follows:

Step 1: two cards are dealt, face down, to each player;

Step 2: a round of wagering occurs[1];

[1] It should be noted that a player is entitled to check, rather than wager; however, if a player checks and another player wagers, the player who checked must match the wager, raise the wager or fold.

Step 3: three community cards are dealt, face up;

Step 4: a round of wagering occurs;

Step 5: the next-to-last "community" card is dealt, face up;

Step 6: a round of wagering occurs;

Step 7: the last community card is dealt, face up;

Step 8: a round of wagering occurs; and

Step 9: each remaining player exposes his down cards, the winter is declared and the pot is distributed.

Each player is entitled to combine one, two or (in rare cases) none of his down cards with any of the five community cards to form the highest possible poker hand. Most often a player will combine three of the community cards with both of his down cards to form a contesting poker hand.

All wagers made during a hand are held in the pot pending distribution to the eventual winner. In any round any player may elect not to wager[2] (or not match another player's wager), in which case that player folds and is no longer eligible to play in the hand.

[2] The exception to this rule is the first round of wagering, in which some players are required to wager a pre-determined amount.

4. The Problem Presented by No Limit Texas Hold 'Em Games

Generally speaking, a game's sponsor will prescribe the minimum and maximum size of any given wager, including raises. However, in games of Texas Hold 'Em that incorporates the all-in wagering variant, there is no pre-set limit to the maximum amount a player may wager (or raise); the maximum amount a player may wager (or raise) is limited only by the amount of money or chips a player has available at that moment in time. Games of Texas Hold 'Em that incorporate the all-in wagering variant are known as No Limit Texas Hold 'Em, or just No Limit Hold 'Em.

In games of No Limit Hold 'Em any player may move all-in at any round of wagering. Once a player has moved all-in, every other player who wishes to remain in the hand must either match the amount wagered by the player who has moved all-in or fold and lose what he had bet to that point[3]. Thereafter, (i) each remaining player exposes his down cards, (ii) all remaining community cards are dealt, face up and (iii) the winner is declared based on the cards revealed.

[3] Note that the nomenclature "all-in" is somewhat of a misnomer: a player who moves all-in does, indeed, place all of his remaining money or chips into the pot, however his potential loss is limited to the maximum amount bet by any other player. Thus, for example, if Player A with 50 chips moves all-in and Player B has only 30 chips but chooses to match the bet and move all-in, Player A's maximum potential loss is 30, rather than 50, chips.

A player who elects to be all-in can no longer make any further decisions about his hand; as a result, a player who may have superior skill or a statistically significant advantage over his opponent(s) can still lose through the luck of the draw. Thus, an all-in decision that may be the correct decision for a player to make from the perspective of statistic or skill (i.e., the superior player will often be able to assess with reasonable accuracy the odds of winning or losing a given hand based on his down cards, the community cards and the relative statistical probability of an opponent having a superior hand) can result in a catastrophic monetary loss.

DETAILED DESCRIPTION OF THE INVENTION & PREFERRED EMBODIMENT

1. Detailed Description of the Invention

Those of ordinary skill in the art will realize that the following description of the invention is illustrative only and not in any way limiting. Other embodiments of the invention will readily suggest themselves to such skilled persons.

As described above in the Brief Summary of the Invention, one significant problem with No Limit Hold Em is that, because a player who is all-in can no longer make any wagering decisions about his hand, luck rather that decision-making skills becomes a bigger part of the game. Thus, a superior player can lose all of his money in an all-in game. Accordingly, a game of California Hold 'Em (i) minimizes the element of luck and maximizes the element of skill in determining winning hands, (ii) will encourage more players to play the game, given the insurance feature of hedging one's potential loss in any given hand and (iii) enable more players to remain in a game after losing a particular hand.

In a game of California Hold Em, when all remaining players have moved all-in and no more wagering is possible, each remaining player will have two specific options to fold and get back a proportionate share of his wager. The invention specifies that a player may recover (a) a set percentage of the amount he has wagered if he folds after the first three community cards are revealed or (b) a lesser percentage of the amount he has wagered if he folds after the fourth community card is revealed (in the preferred embodiment the percentages would be 40% and 20%, respectively). The invention may not be invoked until after the first three community cards have been dealt, not does it permit invocation after the last community card is dealt; thus, players wishing to insure against bad luck may do so only at the points in the hand where luck, rather than skill, will have the most influence on the outcome of the hand.

It should be noted that, because the invention permits any player in the hand to invoke the benefits at one of two decision points, it is quite possible that, in games where more than two players remain after the all-in decision has been made, one player may elect the invention after the first three community cards have been dealt and another player may elect the invention after the fourth community card has been dealt.

It is also important to note that the decision to invoke insurance may only be made after all other wagering decisions have been made. Thus, for example, if Player A moves all-in and, in response. Player B moves all-in, all wagering decisions for that round are over and the next card must be dealt. Continuing the example, after the next card has been dealt, either Player A or Player B may invoke the insurance feature of the invention and elect to fold and receive back a portion of his all-in wager.

In California Hold Em, a layer will have a greater change to avoid what are known as "bad beats" (bad beats are time when a layer has significant statistical advantage over an opponent, but still loses everything). Thus, a player more capable of evaluating the statistical advantages of a particular hand (i.e., the mathematical probabilities associated with the distribution of a fixed universe of playing cards) will now be able to incorporate the concept of insurance to reduce the risk of either moving all-in or remaining in a hand when another player has moved all-in. Similarly, by reducing the risk of moving all-in or remaining all-in, the move is likely to become a more tactical decision, again benefiting the more skillful player.

2. Explanation of the Invention with Reference to the Drawings

The following section should be read with reference to, FIG. 1. For convenience, the referenced drawing has been created with a "dealer" and six position players, denoted Players A through F. The dealer is not a player in either manual (i.e., games dealt in a casino or gaming room) or electronic (either console or on-line) games of No Limit Hold 'Em.

A. FIG. 1

In FIG. 1, a hand of California Hold 'Em is described in which an all-in decision is made after the two down cards have been dealt to each player. There are six players (Players A through F) and the hand proceeds according to the following steps.

Step No. 1: The two down cars are dealt to each player. Each player is permitted to look at his two down cards, but not the down cards of any other player.

Step No. 2: A first round of wagering takes place, with the following results: Player A (the small blind) wagers; Player B (the big blind) wagers; Player C folds; Player D folds; Player E moves all-in; Player F moves all-in; Player A moves all-in; and Player B moves all-in. At this point in the hand, two players have folded and four players have moved all-in; the four players who have moved all-in now reveal their down cards.

Note that the insurance option is not available because the next round of dealing involves the three community cards. A player must decide to match or withdraw without the benefit of the insurance provided by the invention.

Step No. 3: The three community cards are dealt, face up.

Step No. 4: Because the all-in election has been made, no more rounds of wagering can take place; however, since the insurance option is a wagering decision, the following results, as outlined in FIG. 1, take place; Player E does nothing; Player F does nothing; Player A does nothing; and Player B folds with insurance option.

By folding with the insurance at the first opportunity (i.e., after three community cards have been dealt), Player B will receive the recovery percentage[4].

[4] Note that the amount Player B wagered is not necessarily the total amount of money he moved all-in; rather, his wager is equal to the highest of the amounts actually placed at risk by Player A, Player E or Player F.

Step No. 5: The fourth community card as dealt, face up.

Step No. 6: Again, because the all-in election has been made, no more rounds of wagering can take place; however, since the insurance option is a wagering decision, the following results, as outlined in FIG. 1, take place: Player E does nothing; Player F does nothing; and Player A folds with the insurance option.

By folding with the insurance option at the second, and last, opportunity (i.e., after the first three and the fourth community cards have been dealt), Player A will receive the recovery percentage[5].

Note that, in this case, the amount Player A wagered is again the amount actually at risk, i.e., the higher of the amounts actually placed at risk by Player E or Player F.

Step No. 7: The fifth and final community card is dealt, face up, Player E and Player F use their previously revealed down cards and five community cards and the winner is declared based on the highest possible poker hand. The winner receives the pot, which consists of all wagers in the hand (less any fee or commission assessed by the sponsor of the game).

The new No Limit Hold Em game (i.e., a No Limit Hold Em game utilizing the invention) compares favorably with the current game. The invention provides for more decisions and reduces the element of luck. In addition, the invention allows for the more skilled players to have fewer "bad beats" (i.e., situations where a player may be a mathematical favorite but still ends up losing). Further, in that the invention allows players to play longer the invention offers a significant revenue enhancement to sponsors of manual, on-line and console gaming."

What I claim as my invention is:

1. A poker card game played with conventional playing cards, comprising:

(a) first, dealing two cards face down to one or more players in a hand;

(b) second, conducting a first round of betting after the two cards have been dealt; wherein one or more players can wager all his money and be an "all-in" player;

(c) third, if after the first round of betting there is no more betting possible, then the one or more players in the hand must expose their two face down cards;

(d) fourth, dealing three community cards face up, wherein each community card is usable by the one or more players in the hand to form a five card poker hand;

(e) fifth, if no more betting is possible and all of the two face down cards have been exposed, then any of the one or more players in the hand have a first option to fold his hand and get back 40% of his wager, if more betting is possible, conducting a second round of betting;

(f) sixth, if after the second round of betting there is no more betting possible, then the one or more players in the hand must expose their two face down cards;

(g) seventh, dealing one community card face up;

(h) eighth, if no more betting is possible and all of the two face down cards have been exposed, then any of the one or more players in the hand have a second option to fold his hand and get back 20% of his wager, if more betting is possible, conducting a third round of betting;

(i) ninth, if after the third betting round there is no more betting possible, the one or more players in the hand must expose their two face down cards;

(j) tenth, dealing one community card face up;

(k) eleventh, if more betting is possible, conducting a fourth round of betting;

(l) twelve, the one or more players in the hand expose their two face down cards to determine which player has a winning five card poker hand, wherein each hand comprises the two cards dealt to a player plus the five community cards; and said step (a) through (l) being conducted sequentially, beginning with step (a) and concluding with step (1).

* * * * *